US011682962B2

(12) United States Patent
Arpino et al.

(10) Patent No.: US 11,682,962 B2
(45) Date of Patent: Jun. 20, 2023

(54) CIRCUIT FOR CONTROLLING AN OUTPUT OF A POWER CONVERTER

(71) Applicant: Infineon Technologies AG, Neubiberg (DE)

(72) Inventors: Alberto Arpino, San Mauro Pascoli (IT); Michele Bergo, Padua (IT); Cristian Garbossa, Bressanone (IT); Luca Scandola, Villafranca di Verona (IT)

(73) Assignee: Infineon Technologies AG, Neubiberg (DE)

( * ) Notice: Subject to any disclaimer, the term of this patent is extended or adjusted under 35 U.S.C. 154(b) by 109 days.

(21) Appl. No.: 17/241,617

(22) Filed: Apr. 27, 2021

(65) Prior Publication Data
US 2022/0368210 A1 Nov. 17, 2022

(51) Int. Cl.
*H02M 1/08* (2006.01)
*H02M 1/00* (2006.01)

(52) U.S. Cl.
CPC ....... *H02M 1/0022* (2021.05); *H02M 1/0025* (2021.05)

(58) Field of Classification Search
CPC ............. H02M 3/158; H02M 3/33592; H02M 3/0025; H02M 3/0016; H02M 3/0019
See application file for complete search history.

(56) References Cited

U.S. PATENT DOCUMENTS

| 2011/0026275 A1* | 2/2011 | Huang | H02M 3/33576 363/21.02 |
| 2015/0200593 A1* | 7/2015 | Stoichita | H02M 3/158 323/271 |
| 2015/0200595 A1* | 7/2015 | Xiang | H02M 3/33592 363/15 |
| 2015/0200598 A1* | 7/2015 | Kha | H02M 3/33592 363/17 |

OTHER PUBLICATIONS

NXP "VR5500 High voltage PMIC with multiple SMPS and LDO," Preliminary Data Sheet, Rev. 3, May 22, 2019, 130 pp.
Grigore et al., "Dynamics of a Buck Converter with a Constant Power Load," 29th Annual IEEE Power Electronics Specialist Conference, May 22, 1998, IEEE, 7 pp.
Infineon Technolgies AG, "OPTIREG™ PMIC TLF35584," Rev 1.0, Mar. 25, 2019, IFX-jmv1546509847065, 7 pp.
(Continued)

*Primary Examiner* — Kyle J Moody
*Assistant Examiner* — Jye-June Lee
(74) *Attorney, Agent, or Firm* — Shumaker & Sieffert, P.A.

(57) ABSTRACT

This disclosure includes systems, methods, and techniques for controlling a semiconductor device of a power converter. For example, a circuit includes first control circuitry configured to receive an indication of a first voltage which represents a voltage output from a power source to the power converter. Additionally, the first control circuitry is configured to output a control signal to second control circuitry in order to control, based on the first voltage and the second voltage, the semiconductor device so that a second voltage (Continued)

is lower than the first voltage, wherein the second voltage represents a voltage output from the power converter to a load.

19 Claims, 6 Drawing Sheets

(56) References Cited

OTHER PUBLICATIONS

Dragoi, "Optimizing the front-end power solution for automotive ADAS systems," Advances in Science, Technology and Engineering Systems Journal vol. 2, No. 3, Aug. 24, 2017, 8 pp.
Cespedes et al., "Constant-Power Load System Stabilization by Passive Damping," IEEE Transactions On Power Electronics, vol. 26, No. 7, Jul. 2011, 5 pp.
Haligh et al., "Realization of Parasitics in Stability of DC—DC Converters Loaded by Constant Power Loads in Advanced Multiconverter Automotive Systems," IEEE Transactions On Industrial Electronics, vol. 55, No. 6, Jun. 2008, 11 pp.
U.S. Appl. No. 17/241,556, filed Apr. 27, 2021, naming inventors Garbossa et al.
U.S. Appl. No. 17/241,669, filed Apr. 27, 2021, naming inventors Scandola et al.

\* cited by examiner

CIRCUIT FOR CONTROLLING AN OUTPUT OF A POWER CONVERTER

TECHNICAL FIELD

This disclosure relates to circuits for controlling power converters.

BACKGROUND

Drivers are often used to control a voltage, current, or power at a load. For instance, power converter may control the power supplied to the load. Some drivers may include a Direct Current (DC) to DC power converter, such as a buck-boost, buck, boost, or another DC to DC converter. Such DC to DC power converters may be used to control and possibly change the power at the load based on a characteristic of the load.

SUMMARY

In general, this disclosure is directed to devices, systems, and techniques for controlling an output voltage and/or an output current from a power converter. For example, battery may supply an input electrical signal to the power converter, and the power converter may supply an output electrical signal to a load. In some examples, the power converter may represent a buck converter. Control circuitry may control a switching device of the power converter so that the output voltage from the power converter remains lower than the input voltage to the power converter. This may allow the power converter to continue functioning as a buck converter, even when environmental conditions (e.g., cold temperatures) cause the input voltage to the power converter to decrease.

In some examples, a circuit controls a semiconductor device of a power converter. The circuit comprises first control circuitry configured to receive an indication of a first voltage which represents a voltage output from a power source to the power converter. Additionally, the first control circuitry is configured to output a control signal to second control circuitry in order to control, based on the first voltage and the second voltage, the semiconductor device so that a second voltage is lower than the first voltage, wherein the second voltage represents a voltage output from the power converter to a load.

In some examples, a method comprises receiving, by first control circuitry of a circuit for controlling a semiconductor device of a power converter, an indication of a first voltage which represents a voltage output from a power source to the power converter. The method further comprises outputting, by the first control circuitry, a control signal to second control circuitry in order to control, based on the first voltage and the second voltage, the semiconductor device so that a second voltage is lower than the first voltage, wherein the second voltage represents a voltage output from the power converter to a load.

In some examples, a circuit controls a semiconductor device of a power converter. The circuit comprises first control circuitry configured to receive an indication of a first voltage which represents a voltage output from a power source to the power converter. Additionally, the first control circuitry is configured to output a control signal to second control circuitry in order to control, based on the first voltage and the second voltage, the semiconductor device so that a second voltage is lower than the first voltage, wherein the second voltage represents a voltage output from the power converter to a load. The circuit further comprises the second control circuitry.

The summary is intended to provide an overview of the subject matter described in this disclosure. It is not intended to provide an exclusive or exhaustive explanation of the systems, devices, and methods described in detail within the accompanying drawings and description below. Further details of one or more examples of this disclosure are set forth in the accompanying drawings and in the description below. Other features, objects, and advantages will be apparent from the description and drawings, and from the claims.

BRIEF DESCRIPTION OF DRAWINGS

Like reference characters denote like elements throughout the description and figures.

DETAILED DESCRIPTION

Some systems may use a power converter, such as a direct current (DC) to DC converter to control current supplied to a load. This disclosure is directed to a circuit for controlling a voltage output from the power converter to the load, such that the voltage output from the power converter to the load does not exceed a voltage that the power converter receives from a power source. For example, the power converter may represent a buck converter configured to step voltage down. It may be beneficial for the circuit to control the power converter so that the output voltage does not exceed the input voltage, in order to ensure that the power converter continues to operate properly as a buck converter. In some examples, the circuit may control a duty cycle of a semiconductor device of the power converter in order to control the voltage output from the power converter to the load. For example, decreasing the duty cycle may cause the voltage output from the power converter to decrease, and increasing the duty cycle may cause the voltage output from the power converter to increase.

Figure 1:
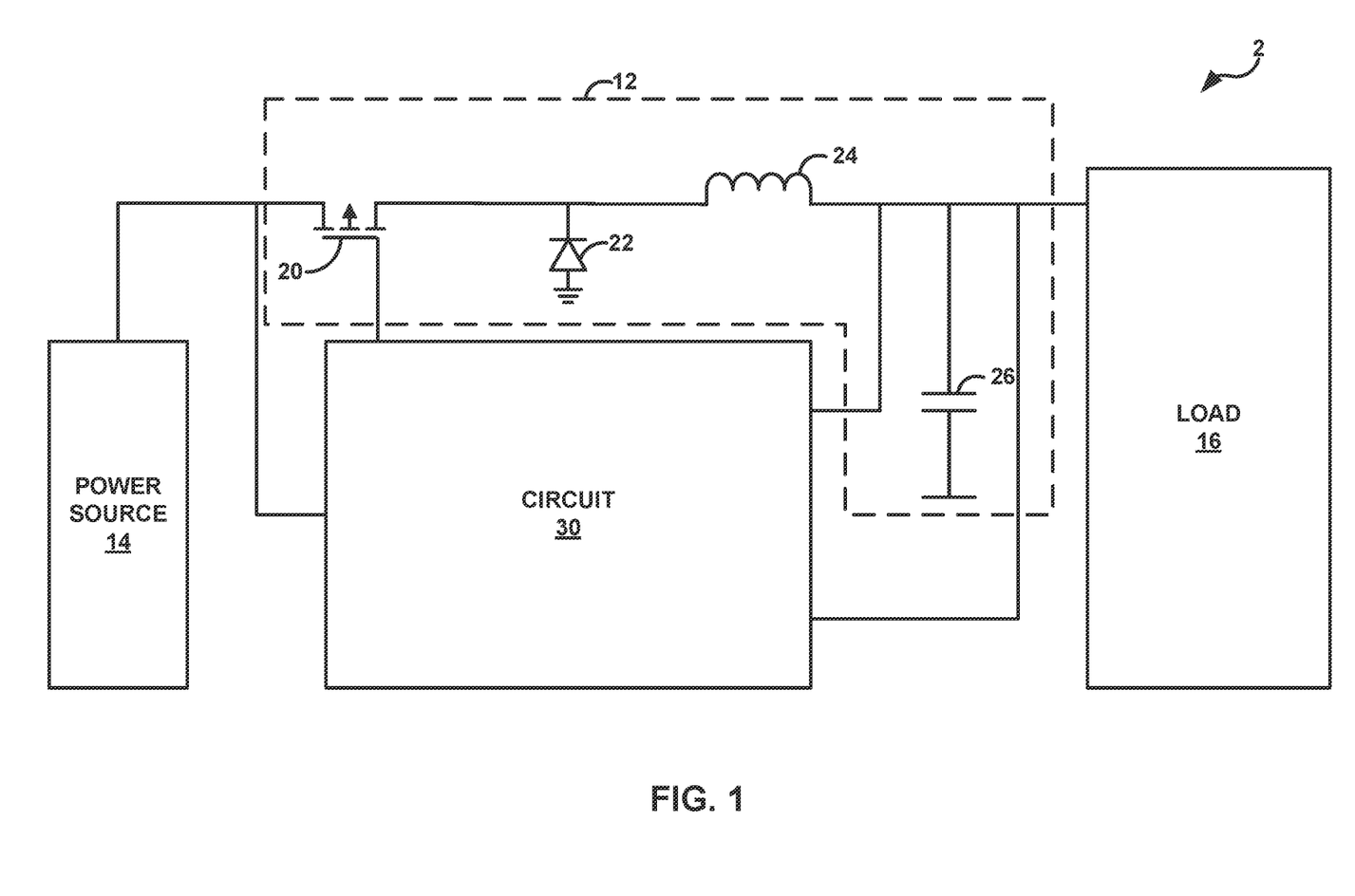
FIG. 1 is a block diagram illustrating a system for controlling a power converter 12, in accordance with one or more techniques of this disclosure.

FIG. 1 is a block diagram illustrating a system 2 for controlling a power converter 12, in accordance with one or more techniques of this disclosure. As illustrated in the example of FIG. 1, system 2 includes power converter 12, power source 14, load 16. Power converter 12 includes semiconductor device 20, semiconductor device 22, inductor 24, and capacitor 26. System 2 further includes a circuit 30 configured to control semiconductor device 20 when power converter 12 is operating in an asynchronous buck mode. Semiconductor device 22 may operate as a diode when power converter 12 is operating in the asynchronous buck mode. In some examples, circuit 30 may be configured to control semiconductor device 20 and semiconductor device 22 when power converter 12 is operating in a synchronous buck mode.

System 2 represents a system for controlling an electrical signal output from power converter 12 to load 16. For example, power source 14 may supply an input electrical signal to power converter 12, and power converter 12 may supply an output electrical signal to load 16. Circuit 30 may control semiconductor device 20 in order to control the output electrical signal to load 16. For example, the input electrical signal may include an input voltage and an input current, and the output electrical signal may include an output voltage and an output current. Circuit 30 may control a duty cycle of the semiconductor device 20 in order to control the output voltage and/or the output current. For example, increasing the duty cycle of the semiconductor device 20 may increase output voltage, and decreasing the duty cycle of the semiconductor device 20 may decrease output voltage. In some examples, power converter 12 represents a buck converter which steps down the input voltage. Circuit 30 may control semiconductor device 20 in order to ensure that the output voltage from power converter 12 remains lower than the input voltage to power converter 12, so that power converter 12 continues to function properly as a buck converter.

Power source 14 is configured to deliver operating power to power converter 12 and circuit 30 and supply power to the load 16. In some examples, power source 14 includes a battery and a generation circuit to produce operating power. In some examples, power source 14 is rechargeable to allow extended operation. Power source 14 may include any one or more of a plurality of different battery types, such as nickel cadmium batteries and lithium ion batteries. In some examples, a maximum voltage output of power source 14 is approximately 12V. In some examples, power source 14 supplies power within a range from 10 Watts (W) to 15 W. In some examples, power source 14 represents a source other than a battery.

Load 16 may define a collection of electrical components that consume power. In some examples, load 16 includes a collection of circuit components such as resistors, inductors, capacitors, diodes, and other semiconductor elements. Load 16 may include one or more post regulator circuits which increase the output voltage delivered by the power converter 12. In some examples, load 16 includes electric motors and other electric components (e.g., dashboard, control panels, heating/cooling systems, and lights) of a vehicle. Example vehicles include cars, trucks, buses, motorcycles, golf carts, all-terrain vehicles (ATVs), snowmobiles, aircraft, and watercraft. In other examples, load 16 includes electric motors and electric components used in other applications.

Power converter 12 includes semiconductor device 20. Semiconductor device 20 may, in some cases, include a power switch such as, but not limited to, any type of field-effect transistor (FET) including any combination of a metal-oxide-semiconductor field-effect transistor (MOSFET), a bipolar junction transistors (BJT), an insulated-gate bipolar transistor (IGBT), a junction field effect transistors (JFET), a high electron mobility transistor (HEMT), or other elements that use voltage and/or current for control. Additionally, semiconductor device 20 may include n-type transistors, p-type transistors, and power transistors, or any combination thereof. In some examples, semiconductor device 20 includes vertical transistors, lateral transistors, and/or horizontal transistors. In some examples, semiconductor device 20 include other analog devices such as diodes and/or thyristors. In some examples, semiconductor device 20 may operate as switches and/or as analog devices.

In some examples, semiconductor device 20 includes three terminals: two load terminals and a control terminal. For MOSFET switches, semiconductor device 20 may include a drain terminal, a source terminal, and at least one gate terminal, where the control terminal is a gate terminal. For BJT switches, the control terminal may be a base terminal. Current may flow between the two load terminals of semiconductor device 20, based on the voltage at the respective control terminal. Therefore, electrical current may flow across semiconductor device 20 based on control signals delivered to the control terminal of semiconductor device 20. In one example, if a voltage applied to the control terminal of semiconductor device 20 is greater than or equal to a voltage threshold, semiconductor device 20 may be activated, allowing semiconductor device 20 to conduct electricity. Furthermore, semiconductor device 20 may be deactivated when the voltage applied to the control terminal of semiconductor device 20 is below the threshold voltage, thus preventing semiconductor device 20 from conducting electricity.

Semiconductor device 20 may include various material compounds, such as Silicon, Silicon Carbide, Gallium Nitride, or any other combination of one or more semiconductor materials. In some examples, silicon carbide switches may experience lower switching power losses. Improvements in magnetics and faster switching, such as Gallium Nitride switches, may allow semiconductor device 20 to draw short bursts of current from power source 14. These higher frequency switching devices may require control signals to be sent with more precise timing, as compared to lower-frequency switching devices.

Power converter 12 further includes semiconductor device 22. In some examples, semiconductor device 22 functions as a diode. In some examples, semiconductor device 22 may be substantially the same as semiconductor device 20. In the field of circuit electronics, diodes include semiconductor components which allow current to flow across the diode in a first direction (e.g., "forward direction") and prevent current from flowing across the diode in a second direction (e.g., "reverse direction"). A diode may include an anode and a cathode, and current may be able to pass through the diode in the forward direction from the anode to the cathode. However, current may be unable to pass through the diode in the reverse direction from the cathode to the anode.

Power converter 12 further includes inductor 24. Inductor 24 may be electrically connected to semiconductor device 20 such that load 16 receives the output electrical signal from power converter 12 through inductor 24. Inductor 24 represents an electrical circuit component that resists change in a magnitude of electrical current passing through inductor 24. In some examples, inductor 24 is defined by an electrically conductive wire that is wrapped in a coil. As electrical current passes through the coil of inductor 24, a magnetic field is created in the coil, and the magnetic field induces a voltage across the inductor. Inductor 24 defines an inductance value, and the inductance value is the ratio of the voltage across inductor 24 to the rate of change of current passing through inductor 24.

Capacitor 26 is an electrical circuit component configured for storing electric potential energy. Capacitor 26 may, in some examples, occupy a "charged" state, where capacitor 26 stores a maximum amount of electric potential energy. Additionally, capacitor 26 may occupy a "discharged" state where capacitor 26 stores little or no electric potential energy. Capacitor 26 may also transition between the charged state and the discharged state. When capacitor 26 is charging, a current flows across capacitor 26, increasing the electric potential energy stored by capacitor 26. When capacitor 26 is discharging, the electric potential energy stored by capacitor 26 is released, causing capacitor 26 to emit an electric current.

In some examples, semiconductor device 20, semiconductor device 22, inductor 24, and capacitor 26 may operate to decrease, or "buck," the input voltage received from power source 14 such that the output voltage to load 16 is less than the input voltage from power source 14. For example, circuit 30 may activate semiconductor device 20 and power source 14 may emit a current, the current travelling to load 16 through inductor 24. As the current passes through inductor 24, a magnetic field is induced in inductor 24. Subsequently, circuit 30 deactivates semiconductor device 20, and current flows from ground to load 16 via semiconductor device 22 and inductor 24. While semiconductor device 20 is deactivated, power source 14 is disconnected from load 16, thus decreasing the magnitude of the output voltage delivered to load 16 from the magnitude of the voltage supplied to power converter 12 by power source 14.

While power converter 12 is operating as a buck converter, a magnitude of a current delivered to load 16 is increased from a magnitude of a current supplied to power converter 12 by battery power source 14. Inductor 24 charges capacitor 26. Each switching cycle, capacitor 26 discharges, increasing the magnitude of the input voltage supplied to load 16. Circuit 30 may activate and deactivate semiconductor device 20 for a plurality of switching cycles, each switching cycle of the plurality of switching cycles defining a window of time beginning with the activation of semiconductor device 20 and ending with the reactivation of semiconductor device 20 after circuit 30 deactivates semiconductor device 20.

The duty cycle of the switching cycles of semiconductor device 20 influences the output voltage from power converter 12. The term "duty cycle" may refer to a ratio of an amount of time that semiconductor device 20 is turned on during a switching cycle to a total time of the switching cycle. For example, a duty cycle of 0.4 means that semiconductor device 20 is turned on for 40% of the total time of the switching cycle. Increasing the duty cycle of a plurality of switching cycles may increase the output voltage from power converter 12, and decreasing the duty cycle of a plurality of switching cycles may decrease the output voltage from power converter 12. Consequently, circuit 30 may control the output voltage from power converter 12 by controlling the duty cycle of semiconductor device 20.

When power converter 12 functions as a buck converter, circuit 30 may control semiconductor device 20 to decrease an output voltage from power converter 12 in response to determining that the input voltage to power converter 12 is falling. For example, use of a starter motor during cold temperatures is known as a "cold crank." The voltage from power source 14 may drop from 12 Volts to approximately 3 Volts in cold temperatures. Circuit 30 may ensure that the output voltage from power converter 12 remains lower than the voltage that power converter 12 receives from power source 14 even when the voltage from power source 14 drops during, for example, cold temperatures.

In some examples, circuit 30 includes first control circuitry and second control circuitry. The first control circuitry is configured to receive an indication of a first voltage which represents a voltage output from power source 14 to power converter 12. Additionally, the first control circuitry is configured to output a control signal to the second control circuitry in order to control, based on the first voltage and the second voltage, semiconductor device 20 so that a second voltage is lower than the first voltage, where the second voltage represents a voltage output from the power converter 12 to load 16. In some examples, the first control circuitry of circuit 30 is further configured to receive an indication of the second voltage. Circuit 30 may control, based on one or both of the first voltage and the second voltage, a duty cycle of semiconductor device 20 so that the second voltage remains lower than the first voltage.

Figure 2:
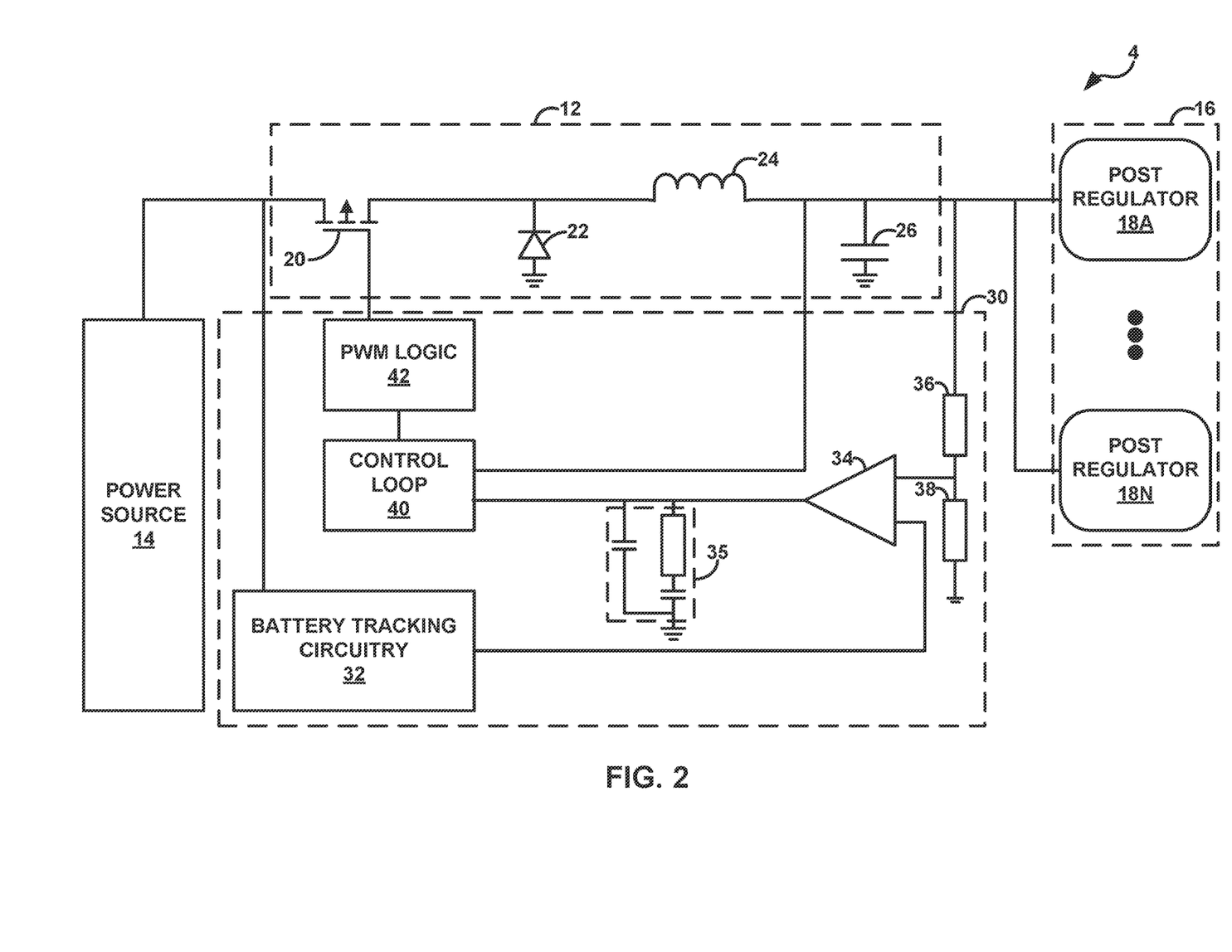
FIG. 2 is a circuit diagram of a first system including battery tracking circuitry and an error amplifier configured to output a control signal in order to control a semiconductor device, in accordance with one or more techniques of this disclosure.

FIG. 2 is a circuit diagram of a first system 4 including battery tracking circuitry 32 and an error amplifier 34 configured to output a control signal in order to control semiconductor device 20, in accordance with one or more techniques of this disclosure. As illustrated in FIG. 2, system 4 includes power converter 12, power source 14, load 16, and circuit 30. Power converter 12 includes semiconductor device 20, semiconductor device 22, inductor 24, and capacitor 26. Load 16 includes post regulators 18A-18N (collectively, "post regulators 18"). Circuit 30 includes battery tracking circuitry 32, error amplifier 34, first resistor 36, second resistor 38, control loop 40, and pulse wave modulator (PWM) logic 42. System 4 may be an example of system 2 of FIG. 1, and system 4 may be configured to perform any of the techniques described with respect to system 2 of FIG. 1. Battery tracking circuitry 32, error amplifier 34, first resistor 36, and first resistor 38 may be referred to herein as "first control circuitry." Control loop 40 and PWM logic 42 may be referred to herein as "second control circuitry."

Load 16 includes post regulators 18. In some examples, post regulators 18 may include buck converters, boost converters, buck-boost converters, resistors, other power-consuming electrical components, or any combination thereof. In some examples, each post regulator of post regulators 18 represents a channel. Some channels may represent LED channels. Some channels may power other electronic circuitry. In any case, post regulators 18 may distribute the voltage output from power converter 12 over the channels in order to provide power to power-consuming components.

Circuit 30 is configured to control semiconductor device 20 in order to regulate the output voltage from power converter 12. For example, Circuit 30 may control semiconductor device 20 through a plurality of switching cycles. In some examples, each switching cycle of the plurality of switching cycles includes a period where the semiconductor device 20 is turned off and a period where the semiconductor device 20 is turned off. By controlling the semiconductor device 20 through a plurality of switching cycles, circuit 30 may control power converter 12 to function as a buck converter. Circuit 30 may control a duty cycle of semiconductor device 20 in order to control the output voltage and the output current from power converter 12.

In some examples, the first control circuitry of circuit 30 may receive information indicative of a first voltage, where the first voltage represents a voltage of an electrical signal delivered from power source 14 to power converter 12. The first control circuitry of circuit 30 may output a control signal to second control circuitry of circuit 30 in order to control, based on the first voltage and a second voltage, semiconductor device 20 so that the second voltage is lower than the first voltage. The second voltage represents a voltage of an electrical signal output from the power converter 12 to the load 16. In some examples, the first control circuitry of circuit 30 is further configured to receive an indication of the second voltage.

In some examples, battery tracking circuitry 32 may include an amplifier (not illustrated in FIG. 2). In some examples, the amplifier of battery tracking circuitry 32 is configured to receive an indication of a first amplifier input voltage, wherein the first amplifier input voltage is a factor of the first voltage. That is, the amplifier input voltage may be a factor of the voltage output from the power source 14 to the power converter 12. In this way, battery tracking circuitry 32 may be configured to "track" the voltage output from the power source 14 so that circuit 30 is configured to control the semiconductor device 20 based on the voltage output from power source 14. The amplifier of battery tracking circuitry 32 may further receive an indication of a second amplifier input voltage. The second amplifier input voltage may represent a "baseline" amplifier input voltage such that the amplifier uses the second amplifier input voltage by default.

In some examples, the amplifier of battery tracking circuitry 32 may represent a minimum selector amplifier. The amplifier of battery tracking circuitry 32 may select the minimum of the first amplifier input voltage and the second amplifier input voltage and output the minimum of the first amplifier input voltage and the second amplifier input voltage. For example, the amplifier of battery tracking circuitry 32 may output a first reference signal comprising a first reference signal voltage. The first reference signal voltage may represent the first amplifier input voltage when the first amplifier input voltage is lower than the second amplifier input voltage. The first reference signal voltage may represent the second amplifier input voltage when the first amplifier input voltage is not lower than the second amplifier input voltage. The amplifier of battery tracking circuitry 32 may output the first reference signal to error amplifier 34.

The amplifier of battery tracking circuitry 32 may receive the first amplifier input voltage from a first voltage divider, wherein the first voltage divider is configured to divide the first voltage so that the first amplifier input voltage is a factor of the first voltage. That is, the first voltage divider may receive the first voltage from power source 14. The first voltage divider may include two resistors, where a node connects the two resistors and the amplifier of battery tracking circuitry 32. The voltage divider may output a factor of the first voltage (e.g., a factor of the voltage output from power source 14) to the amplifier of battery tracking circuitry 32.

Error amplifier 34 may represent a comparator amplifier. That is error amplifier 34 may be configured to output a difference between inputs to error amplifier 34. For example, error amplifier 34 may receive, as a first input, the first reference signal comprising the first reference signal voltage. Additionally, error amplifier may receive, as a second input, a second reference signal comprising a second reference signal voltage. In some examples, the second reference signal is a factor of the second voltage. Error amplifier 34 may receive the second reference signal comprising the second reference signal voltage from a second voltage divider comprising the first resistor 36 and the second resistor 38. The second voltage divider may be configured to divide the second voltage (e.g., the voltage output from power converter 12) so that the second reference signal voltage is a factor of the second voltage. That is, the second voltage divider may receive the second voltage output from power converter 12. A node connects the first resistor 36, the second resistor 38, and error amplifier 34. The second voltage divider may output a factor of the second voltage (e.g., a factor of the voltage output from power converter 12) to the error amplifier 34. Error amplifier 34 may output, to control loop 40, a control signal comprising a control signal voltage. In some examples, the control signal voltage represents a difference between the first reference signal voltage and the second reference signal voltage. In some examples, the control signal voltage represents a factor of a difference between the first reference signal voltage and the second reference signal voltage.

Error amplifier 34 may receive the first reference signal voltage from battery tracking circuitry 32, and battery tracking circuitry 32 generates the first reference signal based on the voltage output from power source 14. Error amplifier 34 may receive the second reference signal voltage based on a voltage output from power converter 12. In some examples, error amplifier 34 may charge a capacitor of compensation unit 35 based on a comparison between the first reference signal and the second reference signal. For example, when a difference between the first reference signal and the second reference signal exceeds a threshold difference, Error amplifier 34 may charge the capacitor of compensation unit 35, thus increasing an output voltage from error amplifier 34.

Control loop 40 may represent circuitry including any combination of circuit components (e.g., resistors, capacitors, inductors, semiconductor devices). Control loop 40 may receive the control signal from error amplifier 34. Additionally, control loop 40 may receive a signal from an output of inductor 24. Control loop 40 may output a signal to PWM logic based on the control signal and the signal from the output of inductor 24. In some examples, control loop 40 is configured to operate with any output from power source 14. That is, in cases where the voltage output from power source 14 drops to a low level (e.g., less than 5V, less than 3V), control loop 40 may still be configured to operate. PWM logic 42 may receive the signal from control loop 40 and control semiconductor device 20. In some examples, PWM logic 42 controls semiconductor device 20 in order to ensure that the output voltage from power converter 12 remains lower than the input voltage to power converter 12.

Figure 3:
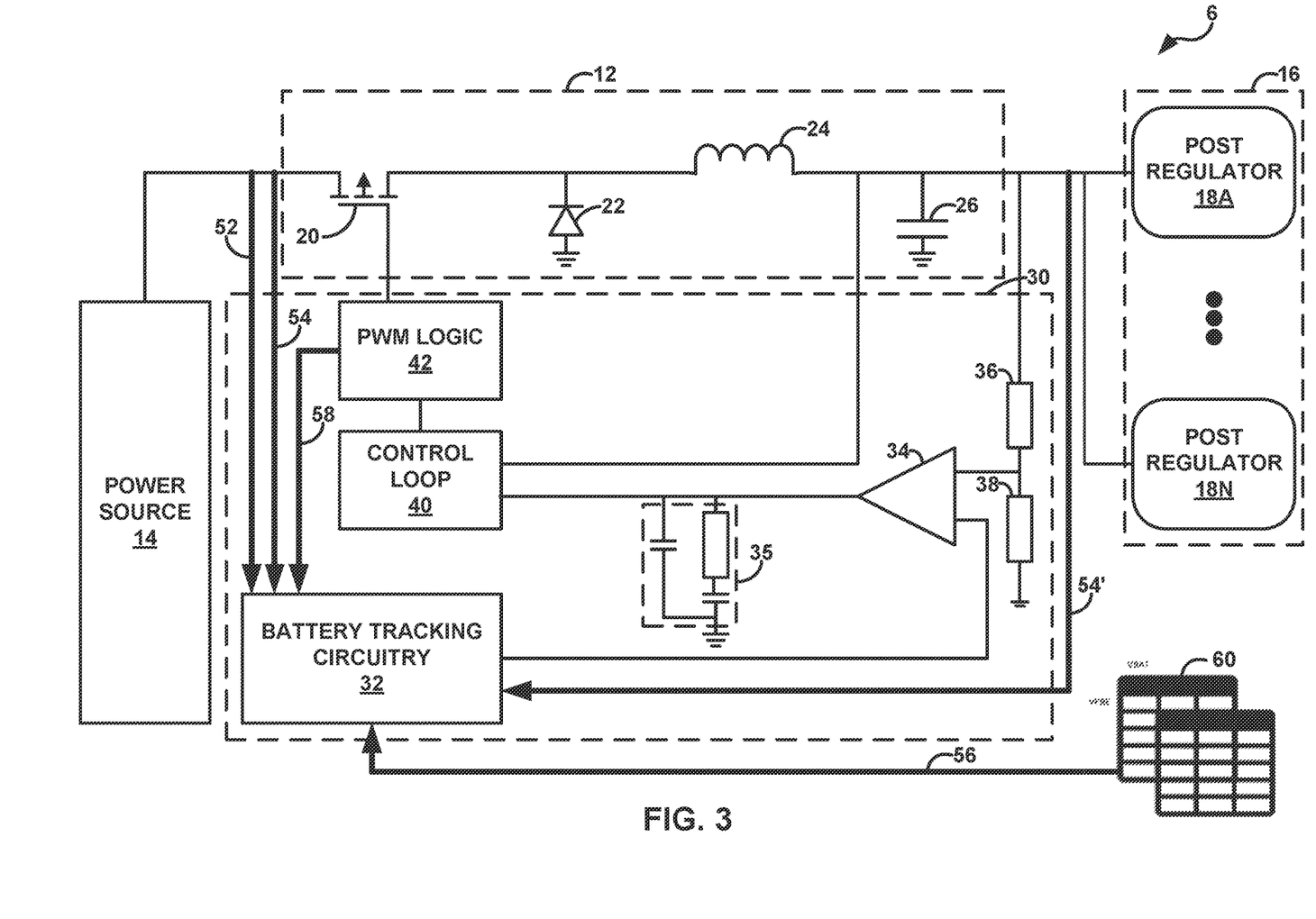
FIG. 3 is a circuit diagram of a second system including battery tracking circuitry and an error amplifier configured to output a control signal in order to control semiconductor device, in accordance with one or more techniques of this disclosure.

FIG. 3 is a circuit diagram of a second system 6 including battery tracking circuitry 32 and an error amplifier 34 configured to output a control signal in order to control semiconductor device 20, in accordance with this disclosure. Second system 6 may be substantially the same as first system 4, except that battery tracking circuitry 32 is configured to receive first input 52, second input 54, second input 54' (collectively, "second inputs 54"), third input 56, fourth input 58, or any combination thereof. System 6 may be configured to perform any of the techniques described with respect to FIG. 1 and FIG. 2.

In some examples, system 4 of FIG. 2 may represent an example of system 6 of FIG. 3 where battery tracking circuitry receives the first input 52 but does not receive second inputs 54, third input 56, and fourth input 58. First input 52 may deliver information indicative of a voltage output from power source 14 to power converter 12 to battery tracking circuitry 32. In examples where battery tracking circuitry 32 receives the first input 52 but does not receive second inputs 54, third input 56, and fourth input 58, battery tracking circuitry 32 may output a first reference signal based on the information indicative of a voltage output from power source 14 to power converter 12, and not based on information indicative of a voltage output from power converter 12 to load 16. Error amplifier 34 may receive the first reference signal, and error amplifier 34 may receive a second reference signal, where the second reference signal is a factor of the voltage output from power converter 12 to load 16. Error amplifier 34 may output a control signal which represents a factor of a difference between the first reference signal and the second reference signal. In this way, battery tracking circuitry 32 may generate the first reference signal based on information indicative of the voltage output from power source 14 to power converter 12, and error amplifier 34 may generate the control signal based on information indicative of the voltage output from power source 14 to power converter 12 and information indicative of the voltage output from power converter 12 to load 16.

In some examples, battery tracking circuitry 32 may receive second inputs 54. Input 54 may deliver information indicative of a voltage output from power source 14 to power converter 12. Input 54' may deliver information indicative of a voltage output from power converter 12 to load 16. Battery tracking circuitry 32 may generate the first reference signal based on the information indicative of the voltage output from power source 14 to power converter 12 and the information indicative of the voltage output from power converter 12 to load 16. In some examples, battery tracking circuitry 32 may generate the first reference signal to represent a factor of a ratio of the voltage output from power converter 12 to load 16 to the voltage output from power source 14 to power converter 12. For example, battery tracking circuitry 32 may generate the first reference signal according to the equation $$V_{ref} = f\left(\frac{V_{pre}}{V_{bat}}\right),$$

where $V_{ref}$ represents the voltage of the first reference signal, $V_{pre}$ represents the voltage output from power converter 12 to load 16, and $V_{bat}$ represents voltage output from power source 14 to power converter 12, and f represents a function that may be a constant factor. Error amplifier 34 may receive the first reference signal, and error amplifier 34 may receive a second reference signal, where the second reference signal is a factor of the voltage output from power converter 12 to load 16. Error amplifier 34 may output a control signal based on the first reference signal and the second reference signal.

In some examples, battery tracking circuitry 32 may include a microcontroller (not illustrated in FIG. 3. The microcontroller may include, for example, microprocessors, digital signal processors (DSPs), application specific integrated circuits (ASICs), field-programmable gate arrays (FPGAs), or equivalent discrete or integrated logic circuitry, or a combination of any of the foregoing devices or circuitry. Accordingly, the microcontroller may include any suitable structure, whether in hardware, software, firmware, or any combination thereof, to perform the functions ascribed herein to the microcontroller.

In some examples, battery tracking circuitry 32 may receive second inputs 54 and third input 56. Input 54 may deliver information indicative of a voltage output from power source 14 to power converter 12. Input 54' may deliver information indicative of a voltage output from power converter 12 to load 16. Third input 56 may represent information from lookup tables 60. For example, one or more lookup tables 60 may include an array of reference signal voltage values, allowing the microcontroller to identify a reference signal voltage based on the voltage output from power source 14 to power converter 12 and the voltage output from power converter 12 to load 16. Battery tracking circuitry 32 may output a first reference signal based on the reference signal voltage identified in the lookup table of lookup tables 60. Error amplifier 34 may receive the first reference signal, and error amplifier 34 may receive a second reference signal, where the second reference signal is a factor of the voltage output from power converter 12 to load 16. Error amplifier 34 may output a control signal which represents a factor of a difference between the first reference signal and the second reference signal.

In some examples, battery tracking circuitry 32 may receive fourth input 58. Fourth input 58 may include information indicative of a duty cycle of semiconductor device 20. The microcontroller of battery tracking circuitry 32 may determine, based on the information indicative of the duty cycle of semiconductor device 20, a voltage output from power source 14 to power converter 12, and a voltage output from power converter 12 to load 16. Consequently, battery tracking circuitry 32 may, in some examples, receive fourth input 58 without receiving first input 52 and/or second inputs 54, and still determine information indicative of the voltage output from power source 14 to power converter 12, and determine information indicative of the voltage output from power converter 12 to load 16. Battery tracking circuitry 32 may generate a first reference signal based on the information indicative of the duty cycle of semiconductor device 20 and output the first reference signal to error amplifier 34. Error amplifier 34 may receive the first reference signal, and error amplifier 34 may receive a second reference signal, where the second reference signal is a factor of the voltage output from power converter 12 to load 16. Error amplifier 34 may output a control signal which represents a factor of a difference between the first reference signal and the second reference signal.

Figure 4:
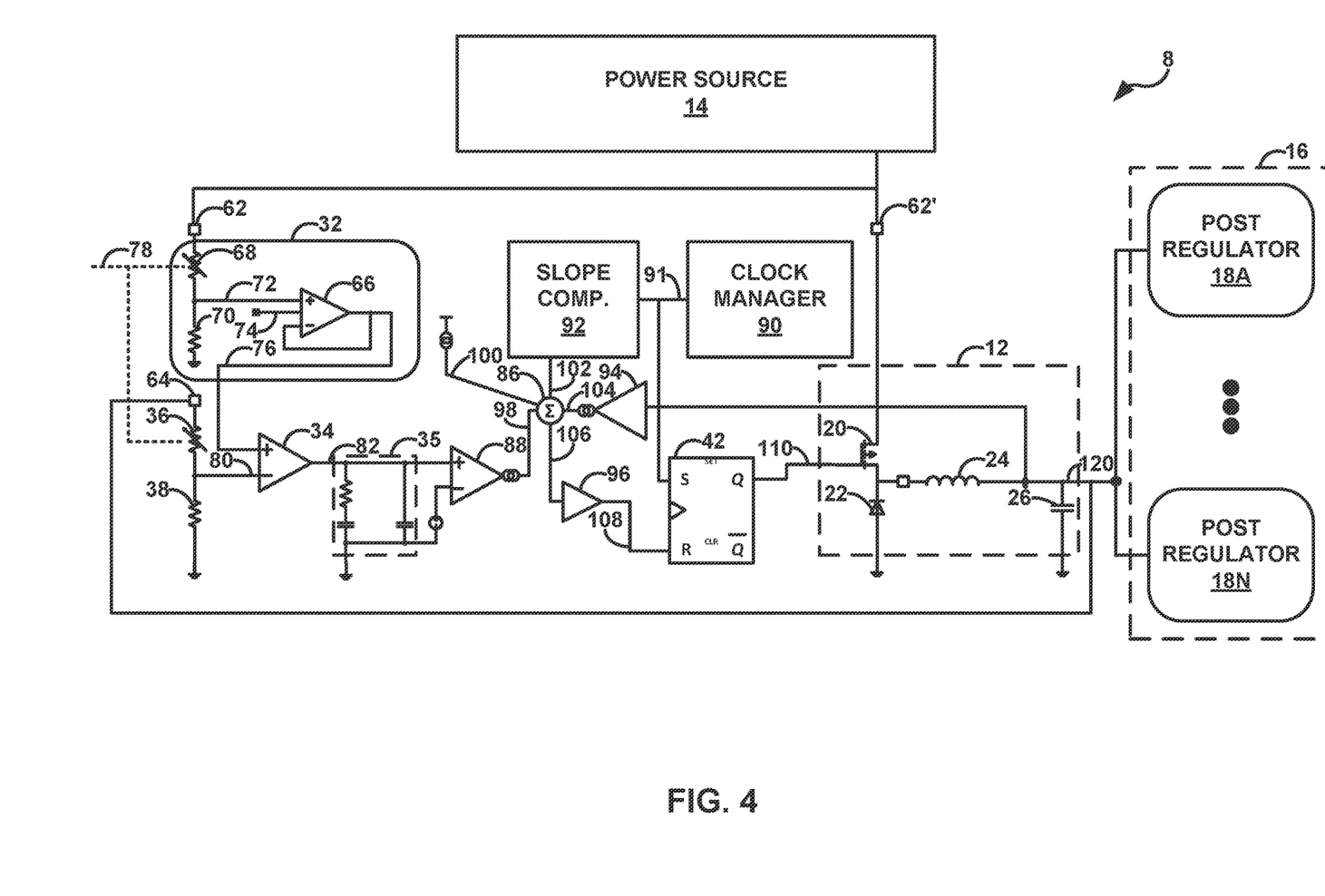
FIG. 4 is a circuit diagram illustrating a third system including battery tracking circuitry and an error amplifier configured to output a control signal in order to control semiconductor device, in accordance with one or more techniques of this disclosure.

FIG. 4 is a circuit diagram illustrating a third system 8 including battery tracking circuitry 32 and an error amplifier 34 configured to output a control signal in order to control semiconductor device 20, in accordance with one or more techniques of this disclosure. As illustrated in FIG. 4, system 8 includes power converter 12, power source 14, and load 16. Power converter 12 includes semiconductor device 20, semiconductor device 22, inductor 24, and capacitor 26. Load 16 includes post regulators 18A-18N (collectively, "post regulators 18"). System 8 further includes battery tracking circuitry 32, error amplifier 34, first resistor 36, second resistor 38, and pulse wave modulator (PWM) logic 42. Battery tracking circuitry 32 further includes battery tracking amplifier 66, first battery tracking resistor 68, and second battery tracking resistor 70. System 8 further includes node 86, first control amplifier 88, clock manager 90, slope compensation unit 92, second control amplifier 94, and third control amplifier 96.

In some examples, system 8 may be configured to operate according to a current mode.

In some examples, system 8 may be an example of system 2 of FIG. 1, and system 8 may be configured to perform any of the techniques described with respect to system 2 of FIG. 1. In some examples, system 8 may be an example of system 4 of FIG. 2, and system 8 may be configured to perform any of the techniques described with respect to system 4 of FIG.

2. In some examples, system 8 may be an example of system 6 of FIG. 3, and system 8 may be configured to perform any of the techniques described with respect to system 6 of FIG. 3.

In some examples, system 8 may be configured to operate according to a current mode. In some examples, system 8 may be configured to operate according to a voltage mode. In the current mode, PWM logic 42 may be configured to control semiconductor device 20 based on current inputs to PWM logic 42. In voltage mode, PWM logic 42 may be configured to control semiconductor device 20 based on voltage inputs to PWM logic 42. When system 8 is operating according to the voltage mode, slope compensation unit 92 might not be necessary, since slope compensation unit 92 controls a slop of a current waveform.

System 8 represents a system for controlling an electrical signal output from power converter 12 to load 16. For example, power source 14 may supply an input electrical signal to power converter 12, and power converter 12 may supply an output electrical signal to load 16. PWM logic 42 may control semiconductor device 20 in order to control the output electrical signal to load 16. For example, the input electrical signal to power converter 12 may include an input voltage and an input current, and the output electrical signal from power converter 12 may include an output voltage and an output current. PWM logic 42 may control a duty cycle of the semiconductor device 20 in order to control the output voltage and/or the output current. For example, increasing the duty cycle of the semiconductor device 20 may increase output voltage, and decreasing the duty cycle of the semiconductor device 20 may decrease output voltage. In some examples, power converter 12 represents a buck converter which steps down the input voltage. PWM logic 42 may control semiconductor device 20 in order to ensure that the output voltage from power converter 12 remains lower than the input voltage to power converter 12, so that power converter 12 continues to function properly as a buck converter.

In some examples, semiconductor device 20, semiconductor device 22, inductor 24, and capacitor 26 may operate to decrease, or "buck," the input voltage received from power source 14 such that the output voltage to load 16 is less than the input voltage from power source 14. For example, PWM logic 42 may activate semiconductor device 20 and power source 14 may emit a current, the current travelling to load 16 through inductor 24. As the current passes through inductor 24, a magnetic field is induced in inductor 24. Subsequently, PWM logic 42 deactivates semiconductor device 20, and current flows from ground to load 16 via semiconductor device 22 and inductor 24. While semiconductor device 20 is deactivated, power source 14 is disconnected from load 16, thus decreasing the magnitude of the output voltage delivered to load 16 from the magnitude of the voltage supplied to power converter 12 by power source 14.

When power converter 12 is operating as a buck converter, a magnitude of a current delivered to load 16 is increased from a magnitude of a current supplied to power converter 12 by power source 14. During each switching cycle, inductor 24 charges capacitor 26, and capacitor 26 discharges, increasing the magnitude of the input voltage supplied to load 16. PWM logic 42 may activate and deactivate semiconductor device 20 for a plurality of switching cycles, each switching cycle of the plurality of switching cycles defining a window of time beginning with the activation of semiconductor device 20 and ending with the reactivation of semiconductor device 20 after PWM logic 42 deactivates semiconductor device 20. While power converter 12 is functioning as a buck converter, semiconductor device 22 permanently functions as a diode.

Battery tracking circuitry 32 may receive information indicative of a voltage output from power source 14 to power converter 12. In some examples, the voltage at pin 62 and pin 62' may represent the voltage output from power source 14, and battery tracking circuitry 32 is connected to power source 14 via pin 62 and power converter 12 is connected to power source 14 via pin 62'. As seen in FIG. 4, battery tracking circuitry 32 includes a battery tracking amplifier 66, first battery tracking resistor 68, and second battery tracking resistor 70. First battery tracking resistor 68 and second battery tracking resistor 70 may represent a voltage divider which divides a voltage received by battery tracking circuitry 32 at pin 62. Consequently, the voltage divider outputs a first amplifier input voltage 72 to battery tracking amplifier 66, where the first amplifier input voltage 72 is a factor of the voltage at pin 62. Battery tracking amplifier 66 may also receive a second amplifier input voltage 74. The second amplifier input voltage 74 may represent a "baseline" amplifier input voltage. In some examples, the second amplifier input voltage 74 is a constant voltage.

In some examples, battery tracking amplifier 66 may represent a minimum selector amplifier. That is, battery tracking amplifier 66 may output the minimum of the first amplifier input voltage 72 and the second amplifier input voltage 74. Since the first amplifier input voltage 72 is a factor of the voltage at pin 62, and the second amplifier input voltage 74 is constant, the first amplifier input voltage 72 may fall below the second amplifier input voltage 74 when the voltage output from power source 14 decreases below a threshold level. The voltage output from power source 14 may decrease for a number of reasons including cold temperatures. Battery tracking amplifier 66 may output a first reference signal 76 comprising a first reference signal voltage, where the first reference signal voltage is the minimum of the first amplifier input voltage 72 and the second amplifier input voltage 74. For example, when the first amplifier input voltage 72 is lower than the second amplifier input voltage 74, battery tracking amplifier 66 may output the first reference signal voltage to have the first amplifier input voltage 72. When the second amplifier input voltage 74 is lower than the first amplifier input voltage 72, battery tracking amplifier 66 may output the first reference signal voltage to have the second amplifier input voltage 74.

Error amplifier 34 may receive the first reference signal 76 comprising the first reference signal voltage. Error amplifier 34 may receive a second reference signal 80 comprising a second reference signal voltage. In some examples, the second reference signal voltage is a factor of a voltage at pin 64. The voltage at pin 64 may represent the voltage output from power converter 12 to load 16. For example, pin 64 may receive the voltage output from power converter 12 to load 16. Resistor 36 and resistor 38 may represent a voltage divider which divides the voltage received at pin 64. Consequently, the voltage divider outputs a second reference signal 80 comprising the second reference signal voltage to error amplifier 34, where the second reference signal voltage is a factor of the voltage at pin 64.

In some examples, error amplifier 34 represents a comparator amplifier. Error amplifier 34 may output a control signal 82 comprising a control signal voltage, wherein the control signal voltage represents a factor of a difference between the first reference signal voltage of first reference signal 76 and the second reference signal voltage of second reference signal 80. In some examples, the first reference signal voltage of first reference signal 76 is a factor of the voltage output from power source 14 to power converter 12 and the second reference signal voltage of second reference signal 80 is a factor of the voltage output from power converter 12 to load 16. Consequently, in some examples, the control signal voltage may represent a factor of a difference between the voltage output from power source 14 to power converter 12 and the voltage output from power converter 12 to load 16. Since control signal 82 may reflect a factor of the difference between the voltage output from power source 14 to power converter 12 and the voltage output from power converter 12 to load 16, system 8 may more effectively control semiconductor device 20 as compared with systems that do not track a difference between the input voltage and the output voltage of a power converter.

System 8 includes a node 86. In some examples, node 86 is connected to first control amplifier 88, slope compensation unit 92, second control amplifier 94, and third control amplifier 96. First control amplifier 88 may receive the control signal 82 and output a signal 98 to node 86. Node 86 may receive a signal 100. In some examples, node 86 receives signal 100 from ground, but this is not required. In some examples, node 86 receives signal 100 from a bias pedestal. Node 86 may receive a signal 102 from slope compensation unit 92. Slope compensation unit 92 may modify a slope of a clock signal 91 generated by clock manager 90. Slope compensation unit 92 may adjust the clock signal 91 in any manner. In some examples, slope compensation unit 92 might not adjust the clock signal 91. Slope compensation unit 92 might not be necessary in one or more examples where system 8 operates in a voltage mode rather than in the current mode of FIG. 4. Node 86 may receive a signal 104 from second control amplifier 94. Second control amplifier 94 may receive a feedback signal from inductor 24.

Node 86 may output a signal 106 to third control amplifier 96, and third control amplifier 96 may output a signal 108 to PWM logic 42. In some examples, third control amplifier 96 represents a comparator semiconductor device. PWM logic 42 may receive clock signal 91 from clock manager 90. Based on signal 108 and the clock signal 91, PWM logic 42 may output a semiconductor control signal 110 to semiconductor device 20. For example, clock manager 90 may output clock signal 91 to control a frequency of semiconductor device 20. PWM logic 42 may control a duty cycle of semiconductor device 20 based on signal 108. Since signal 108 depends on a number of signals received by node 86, including signal 98 which is derived from control signal 82, PWM logic 42 may control the duty cycle of semiconductor device 20 based on the voltage output from power source 14 to power converter 12, and the voltage output from power converter 12 to load 16.

Figure 5:
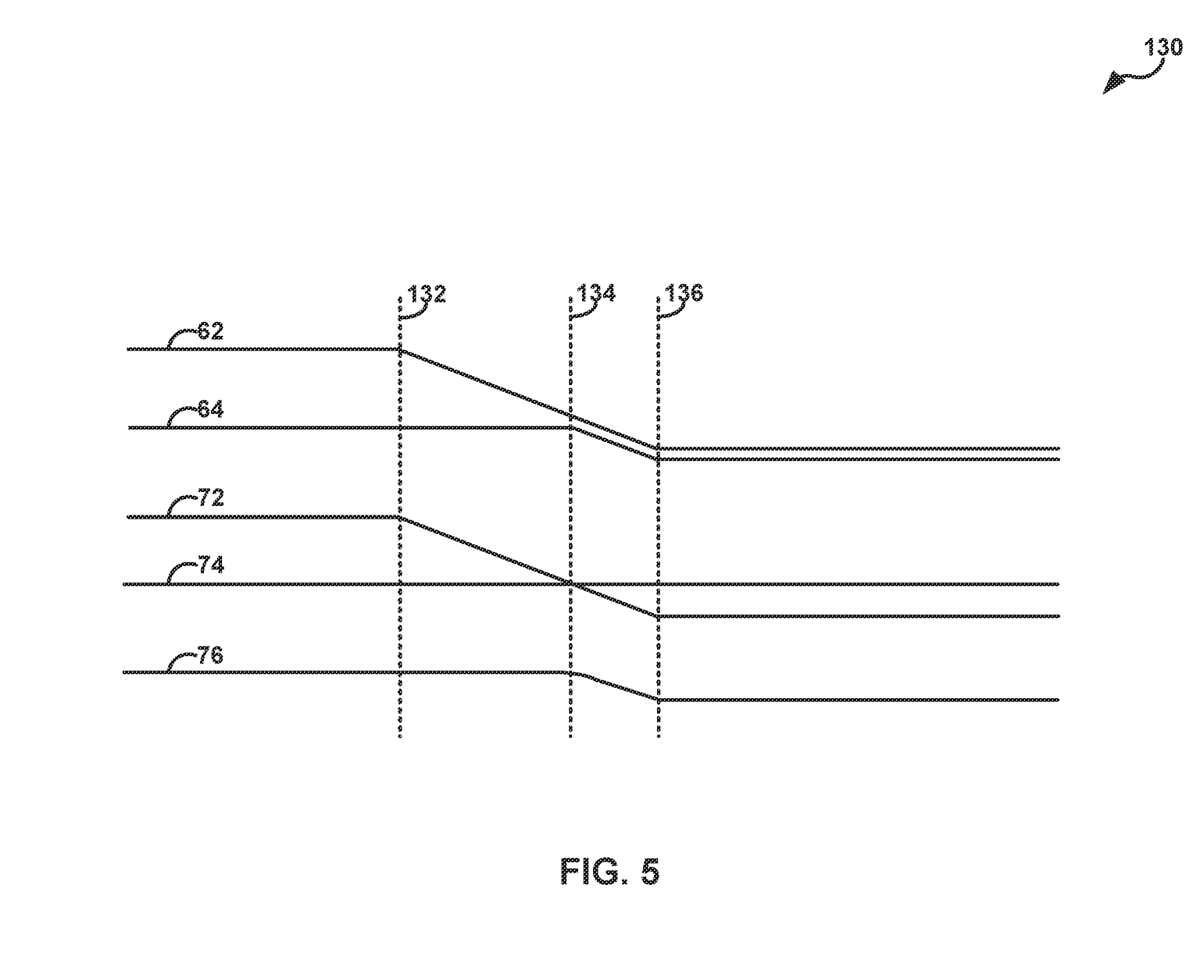
FIG. 5 is a graph illustrating a plot of the voltage at a first pin, the voltage at a second pin, the first amplifier input voltage, the second amplifier input voltage, and the first reference signal voltage of FIG. 4, in accordance with one or more techniques of this disclosure.

FIG. 5 is a graph illustrating a plot 130 of the voltage at pin 62, the voltage at pin 64, the first amplifier input voltage 72, the second amplifier input voltage 74, and the first reference signal 76 of FIG. 4, in accordance with one or more techniques of this disclosure. Plot 130 represents a time plot which shows the behavior of battery tracking amplifier 66 as the voltage at pin 62 decreases. As seen in FIG. 5. The voltage at pin 62 begins to decrease at time 132. First amplifier input voltage 72 decreases as the voltage at pin 62, since the first amplifier input voltage 72 is a factor of the voltage at pin 62. Second amplifier input voltage 74 remains constant as the voltage at pin 62 and the first amplifier input voltage 72 decrease from time 132 to time 136.

At time 134, the first amplifier input voltage 72 decreases below the second amplifier input voltage 74. Since battery tracking amplifier 66 is a minimum selector amplifier which outputs the minimum of the first amplifier input voltage 72 and the second amplifier input voltage 74, the first reference signal voltage of the first reference signal 76 decreases starting at time 134 when the first amplifier input voltage 72 decreases below the second amplifier input voltage 74. The first reference signal voltage of the first reference signal 76 is a factor of the second amplifier input voltage 74 prior to time 132, since the first amplifier input voltage 72 is greater than the second amplifier input voltage 74 prior to time 132. After time 132, the first reference signal voltage is a factor of the second amplifier input voltage 74, because the first amplifier input voltage 72 is less than the second amplifier input voltage 74 after time 132. Consequently, the first reference signal voltage of the first reference signal 76 begins to degrease at time 134, when the first amplifier input voltage 72 decreases below the second amplifier input voltage 74.

As the first reference signal voltage decreases from time 134 to time 136, PWM logic 42 may decrease a duty cycle of semiconductor device 20, thus decreasing a voltage output from power converter 12 to load 16. The voltage at pin 64 may reflect the voltage output from power converter 12 to load 16. As seen in FIG. 5, the voltage at pin 64 decreases from time 134 to time 136 as the first reference signal voltage of the first reference signal 76 decreases. As a result, the voltage at pin 64 remains lower than the voltage at pin 62 following time 134 where the first amplifier input voltage 72 decreases below the second amplifier input voltage 74. It may be beneficial for the voltage at pin 64 to always remain lower than the voltage at pin 62, so that power converter 12 may operate as a buck converter.

Figure 6:
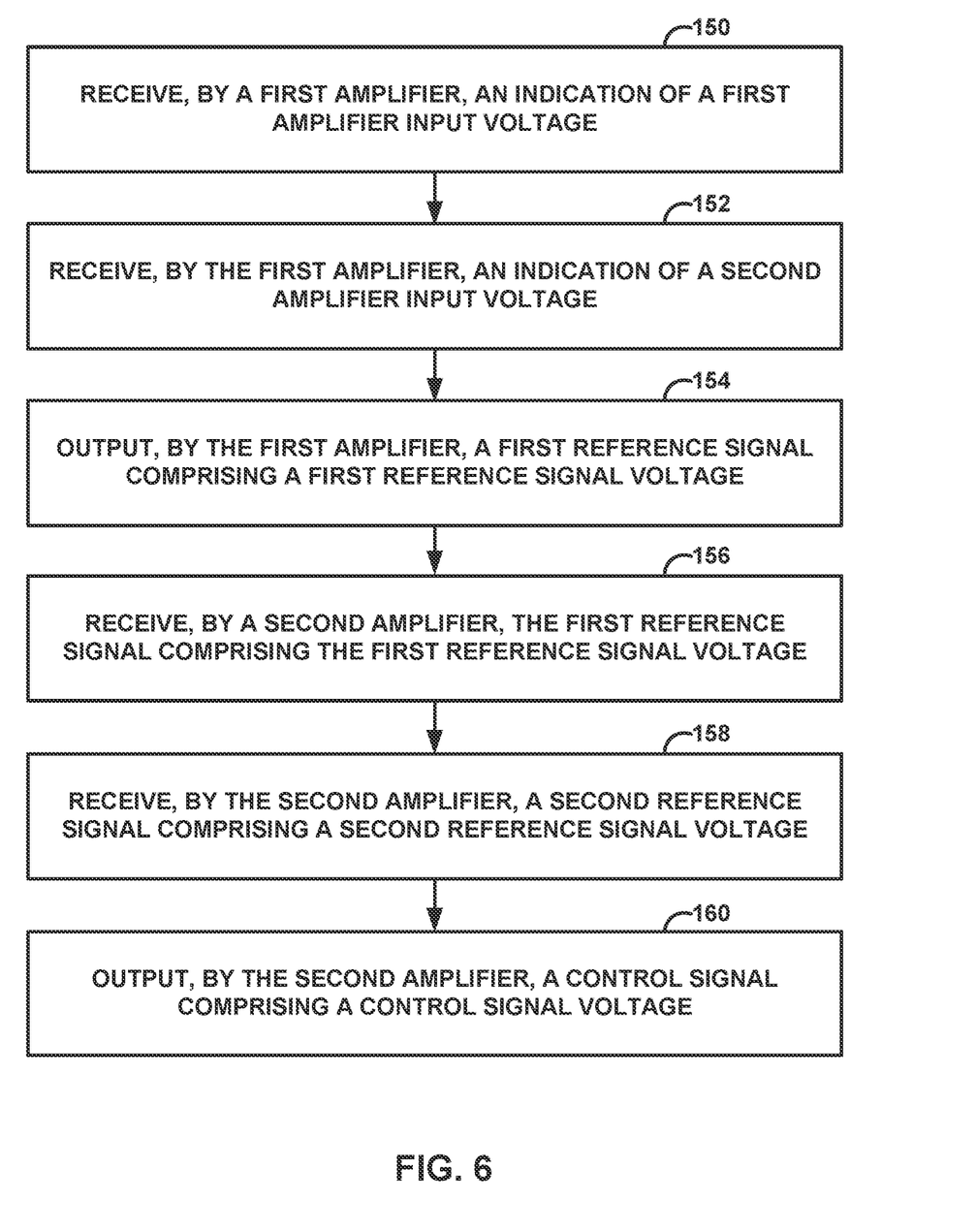
FIG. 6 is a flow diagram illustrating an example operation for controlling a duty cycle of a semiconductor device, in accordance with one or more techniques of this disclosure.

FIG. 6 is a flow diagram illustrating an example operation for controlling a duty cycle of a semiconductor device, in accordance with one or more techniques of this disclosure. FIG. 6 is described with respect to system 8 of FIG. 4. However, the techniques of FIG. 6 may be performed by different components of system 8 or by additional or alternative systems.

Battery tracking amplifier 66 may receive an indication of a first amplifier input voltage 72 (150). In some examples, the first amplifier input voltage 72 is a factor of a voltage at pin 62. The voltage at pin 62 may represent a voltage output from power source 14 to power converter 12. Battery tracking amplifier 66 may receive an indication of a second amplifier input voltage 74 (152). In some examples, the second amplifier input voltage 74 may represent a constant voltage. Battery tracking amplifier 66 may output a first reference signal 76 comprising a first amplifier input voltage (154). Battery tracking amplifier 66 may represent a minimum selector amplifier configured to output a minimum of the first amplifier input voltage 72 and the second amplifier input voltage 74. That is, when the first amplifier input voltage 72 is lower than the second amplifier input voltage 74, the first reference signal 76 includes the first amplifier input voltage 72, and when the first amplifier input voltage 72 is greater than the second amplifier input voltage 74, the first reference signal 76 includes the second amplifier input voltage 74.

Error amplifier 34 receives, from the battery tracking amplifier 66, the first reference signal 76 comprising the first reference signal voltage (156). Error amplifier 34 receives a second reference signal 80 comprising a second reference signal voltage (158). In some examples, the second reference signal voltage of the second reference signal 80 is a factor of a voltage at pin 64. The voltage at pin 64 may represent a voltage output from power converter 12 to load 16. Error amplifier 34 may output a control signal 82 comprising a control signal voltage (160). In some examples, error amplifier 34 is a comparator amplifier which outputs a factor of a difference between the first reference signal voltage and the second reference signal voltage. By outputting the control signal, the error amplifier 34 may control the power converter 12 such that a voltage output from power converter 12 to load 16 remains lower than a voltage output from power source 14 to power converter 12.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field-programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The following numbered clauses may demonstrate one or more aspects of the disclosure.

Clause 1. A circuit for controlling a semiconductor device of a power converter, the circuit comprising: first control circuitry configured to: receive an indication of a first voltage which represents a voltage output from a power source to the power converter; and output a control signal to second control circuitry in order to control, based on the first voltage and a second voltage, the semiconductor device so that the second voltage is lower than the first voltage, wherein the second voltage represents a voltage output from the power converter to a load.

Clause 2. The circuit of clause 1, wherein the first control circuitry is further configured to receive an indication of the second voltage.

Clause 3. The circuit of any of clauses 1-2, wherein the first control circuitry comprises an amplifier configured to: receive an indication of a first amplifier input voltage, wherein the first amplifier input voltage is a factor of the first voltage; receive an indication of a second amplifier input voltage; and output a first reference signal comprising a first reference signal voltage, wherein the reference signal voltage comprises the first amplifier input voltage when the first amplifier input voltage is lower than the second amplifier input voltage, wherein the reference signal voltage comprises the second amplifier input voltage when the first amplifier input voltage is not lower than the second amplifier input voltage, and wherein outputting the reference signal controls the semiconductor device so that the second voltage is lower than the first voltage.

Clause 4. The circuit of clause 3, wherein the amplifier is a first amplifier, wherein the reference signal is a first reference signal, wherein the reference signal voltage is a first reference signal voltage, and wherein the first control circuitry further comprises a second amplifier configured to: receive the first reference signal comprising the first reference signal voltage; receive a second reference signal comprising a second reference signal voltage, wherein the second reference signal voltage is a factor of the second voltage; and output the control signal comprising a control signal voltage, wherein the control signal voltage represents a factor of a difference between the first reference signal voltage and the second reference signal voltage, and wherein outputting the control signal controls the semiconductor device so that the second voltage is lower than the first voltage.

Clause 5. The circuit of clause 4, wherein the first amplifier is configured to receive the first amplifier input voltage from a first voltage divider, wherein the first voltage divider is configured to divide the first voltage so that the first amplifier input voltage is a factor of the first voltage, and wherein the second amplifier is configured to receive the second reference signal from a second voltage divider, wherein the second voltage divider is configured to divide the second voltage so that the second reference signal voltage is a factor of the second voltage.

Clause 6. The circuit of any of clauses 1-5, wherein the circuit further comprises the second control circuitry, and wherein the second control circuitry is configured to: receive, from the first control circuitry, the control signal; and control, based on the control signal, a duty cycle of the semiconductor device so that the second voltage is lower than the first voltage.

Clause 7. The circuit of clause 6, wherein to control the duty cycle of the semiconductor device, the second control circuitry is configured to decrease the duty cycle of the semiconductor device when the control signal indicates that a difference between the first voltage and the second voltage is less than a threshold amount, preventing the first voltage from decreasing lower than the second voltage.

Clause 8. The circuit of any of clauses 6-7, wherein the circuit further comprises pulse-wave modulation (PWM) logic circuitry, wherein the second control circuitry comprises a node configured to: receive a control current of the control signal; receive a slope compensation current; receive a power converter feedback current, wherein the power converter feedback current represents a current output from an inductor of the power converter; and output a semiconductor control current to the PWM logic circuitry.

Clause 9. The circuit of clause 8, wherein the PWM logic circuitry is configured to control, based on the semiconductor control current, the duty cycle of the semiconductor device so that the second voltage is lower than the first voltage.

Clause 10. The circuit of any of clauses 1-9, wherein the power converter represents a buck converter, and wherein the power converter is configured to: receive, from the power source, a first signal comprising the first voltage and a first current; generate a second signal comprising the second voltage and a second current, wherein the second voltage is lower than the first voltage, and wherein the second current is greater than the first current; and deliver the second signal to the load.

Clause 11. The circuit of any of clauses 1-10, wherein the power converter includes the semiconductor device, an inductor, and a capacitor.

Clause 12. A method comprising: receiving, by first control circuitry of a circuit for controlling a semiconductor device of a power converter, an indication of a first voltage which represents a voltage output from a power source to the power converter; and outputting, by the first control circuitry, a control signal to second control circuitry in order to control, based on the first voltage and the second voltage, the semiconductor device so that a second voltage is lower than the first voltage, wherein the second voltage represents a voltage output from the power converter to a load.

Clause 13. The method of clause 12, further comprising receiving, by the first control circuitry, an indication of the second voltage.

Clause 14. The method of any of clauses 12-13, further comprising: receiving, by an amplifier of the first control circuitry, an indication of a first amplifier input voltage, wherein the first amplifier input voltage is a factor of the first voltage; receiving, by the amplifier, an indication of a second amplifier input voltage; and outputting, by the amplifier, a first reference signal comprising a first reference signal voltage, wherein the reference signal voltage comprises the first amplifier input voltage when the first amplifier input voltage is lower than the second amplifier input voltage, wherein the reference signal voltage comprises the second amplifier input voltage when the first amplifier input voltage is not lower than the second amplifier input voltage, and wherein outputting the reference signal controls the semiconductor device so that the second voltage is lower than the first voltage.

Clause 15. The method of clause 14, wherein the amplifier is a first amplifier, wherein the reference signal is a first reference signal, wherein the reference signal voltage is a first reference signal voltage, and wherein the method further comprises: receiving, by a second amplifier of the first control circuitry, the first reference signal comprising the first reference signal voltage; receiving, by the second amplifier, a second reference signal comprising a second reference signal voltage, wherein the second reference signal voltage is a factor of the second voltage; and outputting, by the second amplifier, the control signal comprising a control signal voltage, wherein the control signal voltage represents a factor of a difference between the first reference signal voltage and the second reference signal voltage, and wherein outputting the control signal controls the semiconductor device so that the second voltage is lower than the first voltage.

Clause 16. The method of clause 15, further comprising: receiving, by the first, the first amplifier input voltage from a first voltage divider, wherein the first voltage divider is configured to divide the first voltage so that the first amplifier input voltage is a factor of the first voltage; and receiving, by the second amplifier, the second reference signal from a second voltage divider, wherein the second voltage divider is configured to divide the second voltage so that the second reference signal voltage is a factor of the second voltage.

Clause 15. The method of any of clauses 12-16, wherein the circuit further comprises the second control circuitry, and wherein the method further comprises: receiving, by the second control circuitry from the first control circuitry, the control signal; and controlling, by the second control circuitry based on the control signal, a duty cycle of the semiconductor device so that the second voltage is lower than the first voltage.

Clause 16. The method of clause 15, further comprising: receiving, by the first, the first amplifier input voltage from a first voltage divider, wherein the first voltage divider is configured to divide the first voltage so that the first amplifier input voltage is a factor of the first voltage; and receiving, by the second amplifier, the second reference signal from a second voltage divider, wherein the second voltage divider is configured to divide the second voltage so that the second reference signal voltage is a factor of the second voltage.

Clause 17. The method of any of clauses 12-16, wherein the circuit further comprises the second control circuitry, and wherein the method further comprises: receiving, by the second control circuitry from the first control circuitry, the control signal; and controlling, by the second control circuitry based on the control signal, a duty cycle of the semiconductor device so that the second voltage is lower than the first voltage.

Clause 18. The method of clause 17, wherein controlling the duty cycle of the semiconductor device comprises decreasing the duty cycle of the semiconductor device when the control signal indicates that a difference between the first voltage and the second voltage is less than a threshold amount, preventing the first voltage from decreasing lower than the second voltage.

Clause 19. The method of any of clauses 17-18, wherein the circuit further comprises pulse-wave modulation (PWM) logic circuitry, wherein the method further comprises: receiving, by a node of the second control circuitry, a control current of the control signal; receiving, by the node, a slope compensation current; receiving, by the node, a power converter feedback current, wherein the power converter feedback current represents a current output from an inductor of the power converter; and outputting, by the node, a semiconductor control current to the PWM logic circuitry.

Clause 20. The method of clause 19, wherein the method further comprises controlling, by the PWM logic circuitry based on the semiconductor control current, the duty cycle of the semiconductor device so that the second voltage is lower than the first voltage.

Clause 21. A circuit for controlling a semiconductor device of a power converter, the circuit comprising: first control circuitry configured to: receive an indication of a first voltage which represents a voltage output from a power source to the power converter; and output a control signal to second control circuitry in order to control, based on the first voltage and the second voltage, the semiconductor device so that a second voltage is lower than the first voltage, wherein the second voltage represents a voltage output from the power converter to a load; and the second control circuitry.

Various examples of the disclosure have been described. These and other examples are within the scope of the following claims.

What is claimed is:

1. A circuit for controlling a semiconductor device of a power converter, the circuit comprising first control circuitry including:
    a first amplifier configured to:
        receive an indication of a first amplifier input voltage, wherein the first amplifier input voltage is a factor of a first voltage which represents a voltage output from a power source to the power converter;
        receive an indication of a second amplifier input voltage;
        output, to a second amplifier, a reference signal comprising a reference signal voltage, wherein the reference signal voltage comprises the first amplifier input voltage when the first amplifier input voltage is lower than the second amplifier input voltage, and wherein the reference signal voltage comprises the second amplifier input voltage when the first amplifier input voltage is not lower than the second amplifier input voltage; and the second amplifier configured to:
output, based on the reference signal, a control signal to second control circuitry in order to control, based on the first voltage and a second voltage, the semiconductor device so that the second voltage is lower than the first voltage, wherein the second voltage represents a voltage output from the power converter to a load.

2. The circuit of claim 1, wherein the first control circuitry is further configured to receive an indication of the second voltage.

3. The circuit of claim 1, wherein the reference signal is a first reference signal, wherein the reference signal voltage is a first reference signal voltage, and wherein the second amplifier is further configured to:
receive the first reference signal comprising the first reference signal voltage;
receive a second reference signal comprising a second reference signal voltage, wherein the second reference signal voltage is a factor of the second voltage; and
output the control signal comprising a control signal voltage, wherein the control signal voltage represents a factor of a difference between the first reference signal voltage and the second reference signal voltage, and
wherein outputting the control signal controls the semiconductor device so that the second voltage is lower than the first voltage.

4. The circuit of claim 3,
wherein the first amplifier is configured to receive the first amplifier input voltage from a first voltage divider, wherein the first voltage divider is configured to divide the first voltage so that the first amplifier input voltage is a factor of the first voltage, and
wherein the second amplifier is configured to receive the second reference signal from a second voltage divider, wherein the second voltage divider is configured to divide the second voltage so that the second reference signal voltage is a factor of the second voltage.

5. The circuit of claim 1, wherein the circuit further comprises the second control circuitry, and wherein the second control circuitry is configured to:
receive, from the first control circuitry, the control signal; and
control, based on the control signal, a duty cycle of the semiconductor device so that the second voltage is lower than the first voltage.

6. The circuit of claim 5, wherein to control the duty cycle of the semiconductor device, the second control circuitry is configured to decrease the duty cycle of the semiconductor device when the control signal indicates that a difference between the first voltage and the second voltage is less than a threshold amount, preventing the first voltage from decreasing lower than the second voltage.

7. The circuit of claim 5, wherein the circuit further comprises pulse-wave modulation (PWM) logic circuitry, wherein the second control circuitry comprises a node configured to:
receive a control current of the control signal;
receive a slope compensation current;
receive a power converter feedback current, wherein the power converter feedback current represents a current output from an inductor of the power converter; and
output a semiconductor control current to the PWM logic circuitry.

8. The circuit of claim 7, wherein the PWM logic circuitry is configured to control, based on the semiconductor control current, the duty cycle of the semiconductor device so that the second voltage is lower than the first voltage.

9. The circuit of claim 1, wherein the power converter represents a buck converter, and wherein the power converter is configured to:
receive, from the power source, a first signal comprising the first voltage and a first current;
generate a second signal comprising the second voltage and a second current, wherein the second voltage is lower than the first voltage, and wherein the second current is greater than the first current; and
deliver the second signal to the load.

10. The circuit of claim 9, wherein the power converter includes the semiconductor device, an inductor, and a capacitor.

11. A method comprising:
receiving, by a first amplifier of a first control circuitry of a circuit for controlling a semiconductor device of a power converter, an indication of a first amplifier input voltage, wherein the first amplifier input voltage is a factor of a first voltage which represents a voltage output from a power source to the power converter;
receiving, by the first amplifier, an indication of a second amplifier input voltage;
outputting, by the first amplifier to a second amplifier, a reference signal comprising a reference signal voltage, wherein the reference signal voltage comprises the first amplifier input voltage when the first amplifier input voltage is lower than the second amplifier input voltage, and wherein the reference signal voltage comprises the second amplifier input voltage when the first amplifier input voltage is not lower than the second amplifier input voltage; and
outputting, by the second amplifier of the first control circuitry based on the reference signal, a control signal to second control circuitry in order to control, based on the first voltage and a second voltage, the semiconductor device so that a second voltage is lower than the first voltage, wherein the second voltage represents a voltage output from the power converter to a load.

12. The method of claim 11, further comprising receiving, by the first control circuitry, an indication of the second voltage.

13. The method of claim 11, wherein the amplifier is a first amplifier, wherein the reference signal is a first reference signal, wherein the reference signal voltage is a first reference signal voltage, and wherein the method further comprises:
receiving, by a second amplifier of the first control circuitry, the first reference signal comprising the first reference signal voltage;
receiving, by the second amplifier, a second reference signal comprising a second reference signal voltage, wherein the second reference signal voltage is a factor of the second voltage; and
outputting, by the second amplifier, the control signal comprising a control signal voltage, wherein the control signal voltage represents a factor of a difference between the first reference signal voltage and the second reference signal voltage, and wherein outputting the control signal controls the semiconductor device so that the second voltage is lower than the first voltage.

14. The method of claim 13, further comprising:
receiving, by the first amplifier, the first amplifier input voltage from a first voltage divider, wherein the first voltage divider is configured to divide the first voltage so that the first amplifier input voltage is a factor of the first voltage; and
receiving, by the second amplifier, the second reference signal from a second voltage divider, wherein the second voltage divider is configured to divide the second voltage so that the second reference signal voltage is a factor of the second voltage.

15. The method of claim 11, wherein the circuit further comprises the second control circuitry, and wherein the method further comprises:
receiving, by the second control circuitry from the first control circuitry, the control signal; and
controlling, by the second control circuitry based on the control signal, a duty cycle of the semiconductor device so that the second voltage is lower than the first voltage.

16. The method of claim 15, wherein controlling the duty cycle of the semiconductor device comprises decreasing the duty cycle of the semiconductor device when the control signal indicates that a difference between the first voltage and the second voltage is less than a threshold amount, preventing the first voltage from decreasing lower than the second voltage.

17. The method of claim 15, wherein the circuit further comprises pulse-wave modulation (PWM) logic circuitry, wherein the method further comprises:
receiving, by a node of the second control circuitry, a control current of the control signal;
receiving, by the node, a slope compensation current;
receiving, by the node, a power converter feedback current, wherein the power converter feedback current represents a current output from an inductor of the power converter; and
outputting, by the node, a semiconductor control current to the PWM logic circuitry.

18. The method of claim 17, wherein the method further comprises controlling, by the PWM logic circuitry based on the semiconductor control current, the duty cycle of the semiconductor device so that the second voltage is lower than the first voltage.

19. A circuit for controlling a semiconductor device of a power converter, the circuit comprising:
first control circuitry including:
a first amplifier configured to:
receive an indication of a first amplifier input voltage, wherein the first amplifier input voltage is a factor of a first voltage which represents a voltage output from a power source to the power converter;
receive an indication of a second amplifier input voltage;
output, to a second amplifier, a reference signal comprising a reference signal voltage, wherein the reference signal voltage comprises the first amplifier input voltage when the first amplifier input voltage is lower than the second amplifier input voltage, and wherein the reference signal voltage comprises the second amplifier input voltage when the first amplifier input voltage is not lower than the second amplifier input voltage; and
the second amplifier configured to:
output, based on the reference signal, a control signal to second control circuitry in order to control, based on the first voltage and a second voltage, the semiconductor device so that the second voltage is lower than the first voltage, wherein the second voltage represents a voltage output from the power converter to a load; and
the second control circuitry.

* * * * *